US012357004B2

(12) United States Patent
Lazzarini et al.

(10) Patent No.: US 12,357,004 B2
(45) Date of Patent: Jul. 15, 2025

(54) DOUBLE MEMBRANE VALVE WITH INTERPOSED RING

(71) Applicant: ALI GROUP S.R.L.—CARPIGIANI, Cernusco sul Naviglio (IT)

(72) Inventors: Roberto Lazzarini, Reggio Emilia (IT); Federico Tassi, Bologna (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 620 days.

(21) Appl. No.: 17/228,141

(22) Filed: Apr. 12, 2021

(65) Prior Publication Data

US 2021/0315233 A1     Oct. 14, 2021

(30) Foreign Application Priority Data

Apr. 14, 2020   (IT) ................. 102020000007810

(51) Int. Cl.
*F16K 31/126* (2006.01)
*A23G 9/22* (2006.01)
*A23G 9/28* (2006.01)

(52) U.S. Cl.
CPC ............. *A23G 9/283* (2013.01); *A23G 9/228* (2013.01)

(58) Field of Classification Search
CPC .... F16K 41/10; F16K 31/1268; F16K 31/365; F16K 31/1262; F16K 31/1266;
(Continued)

(56) References Cited

U.S. PATENT DOCUMENTS 2,577,967 A * 12/1951 Hughes ........... F16K 31/365
123/179.17
2,583,664 A * 1/1952 Oldham ............ F16K 17/085
137/469
(Continued)

FOREIGN PATENT DOCUMENTS

CN      108980363 A     12/2018
CN      110566428 A     12/2019
(Continued)

OTHER PUBLICATIONS

Italian Search Report dated Nov. 23, 2020 from counterpart Italian Patent Application No. 202000007810.
(Continued)

*Primary Examiner* — Charles P. Cheyney
(74) *Attorney, Agent, or Firm* — SHUTTLEWORTH & INGERSOLL, PLC; Timothy J. Klima

(57) ABSTRACT

A pneumatically actuated valve includes a valve body, an inlet duct connected to the valve body and an outlet duct connected to the same valve body, a shut-off valve acting to selectively interrupt or allow the connection between the inlet duct and the outlet duct, a control chamber associated with the valve body and includes a first deformable membrane and a second deformable membrane which are adapted to form a flexible wall delimiting a closed, sealed space inside the control chamber and which operate on the shut-off valve. The valve further includes a spacing element interposed between the first deformable membrane and the second deformable membrane to define an intermediate chamber between the first deformable membrane and the second deformable membrane, the intermediate chamber being without fluid sealing.

8 Claims, 4 Drawing Sheets

(58) Field of Classification Search
CPC ............. G05D 16/0652; G05D 16/185; G05D 16/163; Y10T 137/782; Y10T 137/7762; Y10T 137/7737; A23G 9/283; A23G 9/228
USPC ........ 251/61.2; 137/312, 505.42, 510; 92/97
See application file for complete search history.

(56) References Cited

U.S. PATENT DOCUMENTS

| | | | | |
|---|---|---|---|---|
| 2,620,816 | A * | 12/1952 | Griswold | F16K 15/06 137/487 |
| 2,806,481 | A * | 9/1957 | Faust | G05D 16/163 137/484.8 |
| 3,762,430 | A * | 10/1973 | Maercklein | G05D 11/006 137/98 |
| 4,208,031 | A * | 6/1980 | Jonak | G05D 16/0652 92/97 |
| 4,625,695 | A * | 12/1986 | Tuckey | F02M 37/0029 92/97 |
| 4,646,700 | A * | 3/1987 | Tuckey | G05D 16/0641 92/97 |
| 4,776,368 | A * | 10/1988 | Drozd | G05D 16/185 137/505.22 |
| 4,794,940 | A * | 1/1989 | Albert | F16K 31/1266 92/49 |
| 4,828,218 | A * | 5/1989 | Medlock | B05B 12/088 251/28 |
| 5,218,991 | A * | 6/1993 | Gray | G05D 16/185 137/505.14 |
| 5,284,299 | A * | 2/1994 | Medlock | B05B 7/0081 239/533.1 |
| 5,785,023 | A * | 7/1998 | Cross | F02M 69/54 123/463 |
| 9,622,910 | B2 * | 4/2017 | Field | F16K 31/1266 |
| 11,236,846 | B1 * | 2/2022 | Glick | G08B 6/00 |
| 11,835,153 | B2 * | 12/2023 | Yajima | G05D 16/02 |
| 2005/0056318 | A1 * | 3/2005 | Arlinghaus | G05D 16/185 137/505.13 |
| 2008/0110506 | A1 | 5/2008 | Igarashi | |
| 2013/0015377 | A1 | 1/2013 | Gamache | |
| 2018/0343888 | A1 * | 12/2018 | Cocchi | F16K 31/1266 |

FOREIGN PATENT DOCUMENTS

| | | |
|---|---|---|
| EP | 3409983 A1 | 12/2018 |
| JP | 2017038593 A | 2/2017 |
| JP | 2019052749 A | 4/2019 |

OTHER PUBLICATIONS

Chinese Office Action dated Dec. 5, 2023 from counterpart Chinese App No. 202110401431.9.

Japanese Office Action dated Dec. 6, 2024 from counterpart Japanese App No. 2021-066262.

* cited by examiner

DOUBLE MEMBRANE VALVE WITH INTERPOSED RING

This application claims priority to Italian Patent Application 102020000007810 filed Apr. 14, 2020, the entirety of which is incorporated by reference herein.

This invention addresses the sector relating to machines for making ice cream, more precisely, soft serve ice cream, and more generally speaking, liquid or semi-liquid food products.

More specifically, this invention relates to a valve forming part, in these machines, of the circuit which feeds the base product and from which, the finished liquid or semi-liquid is subsequently obtained and dispensed.

In the ice cream trade in question, (soft serve) ice cream machines are known which comprise a batch freezing cylinder (or chamber) associated with a refrigeration system and equipped with a stirrer.

The batch freezing cylinder allows making the finished product (gelato or soft serve ice cream) from a base mixture fed from, and suitably measured and prepared in, another container.

The base mixture is fed to the batch freezing cylinder from suitable containers, that is to say, flexible feeding containers which basically comprise a flexible bag whose wall is provided with an opening through which the product is fed out.

These flexible feeding containers are configured to deform as the product is extracted from them; in other words, their volume depends on the quantity of product they contain.

The product withdrawn from the flexible containers is channeled to the batch freezing cylinder in the machine by a circuit consisting of a system of ducts connecting the feeding containers to the processing (batch freezing) chamber.

The ducts are each attached to a respective feeding container by means of a pneumatically operated shut-off valve which is associated in known manner to the respective container.

Each valve can be activated and deactivated independently of the other valves, if any, by a pneumatic control signal received through a respective duct connected to a source of compressed air through interposed control means driven by the main control unit of the machine.

The valve is provided with a deformable membrane, which is subjected to the air pressure generated by the pneumatic control system to drive the shut-off system, and trade operators often complain about problems with valve integrity.

In other words, there is always the risk of the membrane breaking under the pressure of the air if the valve is subjected to overpressure (for example, on account of the faulty operation of the control and drive system) or on account of wear or problems with valve material structure or sudden pressure changes, allowing the pressurized air to pass through the valve body and to reach the flexible feeding container, causing it to burst and spilling its contents inside the machine.

In the very undesirable event of this happening, the machine must be shut down and thoroughly cleaned to restore proper hygienic conditions and correct machine operation. Moreover, the product wasted and the need to replace the broken container with a new one full of product are also factors to be taken into account.

Therefore, a need that is felt particularly strongly in the trade is to be able to rely on robust valves which can guarantee a more resistant drive system and which will in no way allow the compressed air used to drive them to reach the flexible containers they are connected to.

This disclosure therefore has for an aim to overcome the above described drawbacks and that is to say, to meet the above mentioned need.

More specifically, the aim of this disclosure is to provide a valve for controlling the supply of products withdrawn from corresponding flexible containers in a machine for making ice cream or liquid or semi-liquid products with a constructional configuration such as to ensure correct operation at all times.

Another aim of this disclosure is to provide a valve which allows an operator to identify promptly and clearly any situations where the valve or any part of it is damaged or not working properly so as to prevent it from being used under conditions which are potentially dangerous for human health.

Yet another aim of this disclosure is to provide a machine for making liquid or semi-liquid products equipped with the above mentioned valve, which prevents the pressurized air used for its operation from breaking the flexible containers and causing the base products contained therein to spill into the machine, and which thus avoids prolonged machine down time.

According to the disclosure, these aims are achieved by a valve and a machine forming the object of the disclosure and comprising the technical features described in one or more of the appended claims.

The technical features of the disclosure, with reference to the above aims, are clearly described in the claims below and its advantages are apparent from the detailed description which follows, with reference to the accompanying drawings which illustrate a preferred, non-limiting example embodiment, and in which:

With reference to the accompanying drawings, the numeral 1 denotes an apparatus or machine for making liquid or semi-liquid products.

In particular, the machine 1 allows making ice cream products. More precisely, the machine 1 allows making one or more of the following products: artisan gelato, soft serve ice cream, sorbets.

Figure 1:
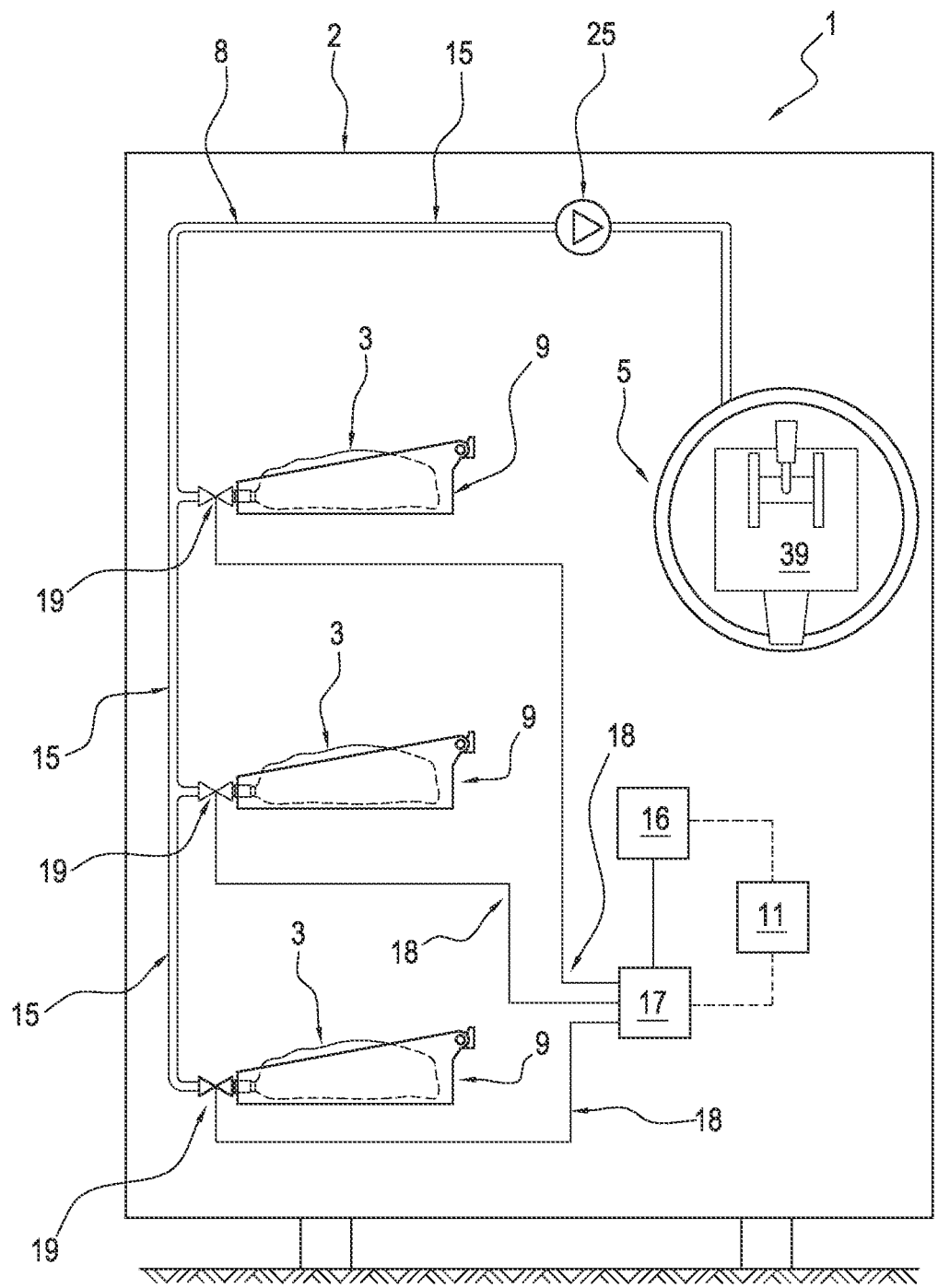
FIG. 1 is a schematic side view of a machine for making liquid or semi-liquid products comprising the valve of this disclosure.

More in detail and with reference to FIG. 1, the machine 1 comprises a frame 2 in which feeding containers 3 are mounted (for example, three such containers are shown in FIG. 1 but there might be any number of them, even just one container). Each feeding container 3 has a deformable wall and contains a liquid or semi-liquid base mixture. Thus, the volume occupied by each first container 3 depends on a quantity of base mixture or additive product contained therein.

According to an aspect, the containers 3 are preferably placed on suitable supporting means 9, operatively associated with the frame 2, and are connected to a network 15 of transfer ducts 8.

Operating in the network 15 of ducts 8, there is a pump 25 (at least one), for example a peristaltic pump, which withdraws the base mixture, or the additive product, from the feeding containers 3 and sends it through the end section of the network 15 of ducts 8 to a processing chamber 5 (more precisely, a batch freezing chamber).

It should be noted that in an embodiment not illustrated, each feeding container 3 might be connected to the batch freezing chamber 5 by a respective connecting duct 8 and related pump 25 (the connecting duct 8 and the related pump 25 being dedicated specifically to one and one only feeding container 3).

Preferably, the transfer pump 25 is operatively connected to each of the feeding containers 3: it should be noted that the valve 19, when it is in the open position, allows establishing the fluid connection between the respective feeding container 3 and the pump 25, whilst when it is in the closed position, it inhibits the fluid connection between the respective feeding container 3 and the pump 25.

In the processing chamber 5, the base mixture is mixed by a stirrer, while the thermal treatment means act in conjunction with the stirrer to convert the base mixture into a liquid or semi-liquid product.

It should be noted that the means for thermally treating the basic mixture comprise a thermodynamic system (not illustrated) equipped with at least one heat exchanger (evaporator) associated with the processing chamber 5.

Preferably, the thermal system comprises a hydraulic circuit provided with a heat exchanger fluid and which operates according to a thermodynamic cycle.

The transfer pump 25, which is operatively interposed between the feeding containers 3 and the processing chamber 5, thus transfers the products from the feeding containers 3 to the processing chamber 5.

In the embodiment illustrated in FIG. 1, the transfer ducts 8 connecting the feeding containers 3 to the processing chamber 5, are configured to allow operatively connecting each of the feeding containers 3 (selectively) to the processing chamber 5 and withdrawing the base mixture, or the additive product, as required in each case and in the required quantity, from each of the feeding containers 3.

The general operation of the machine 1 and its components is guaranteed and controlled by an electronic, operation and control unit 11.

More specifically, for the selective connection of the feeding containers 3 to the transfer ducts 8, there are a plurality of pneumatically actuated valves 19, each of which is associated with one of the feeding containers 3.

An interface (not illustrated) is connected to the operation and control unit 11 of the machine 1 and its components and is provided with control commands, which can be operated to control the valves 19 in such a way as to (selectively) place one of said feeding containers 3 in fluid communication with the processing chamber 5.

In practice, the interface allows sending a control signal to the operation and control unit 11 which in turn, as a function of the control signals received, selectively opens one of the valves 19 (based on the selection made).

Figure 2:
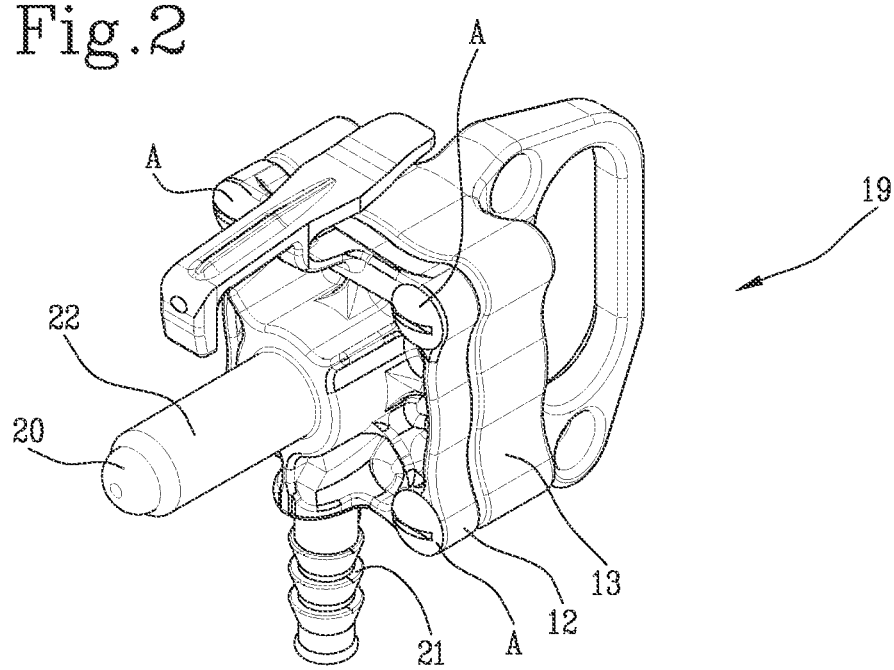
FIG. 2 is a schematic perspective view of the valve mounted on the machine of FIG. 1 for making liquid or semi-liquid products.
Figure 3:
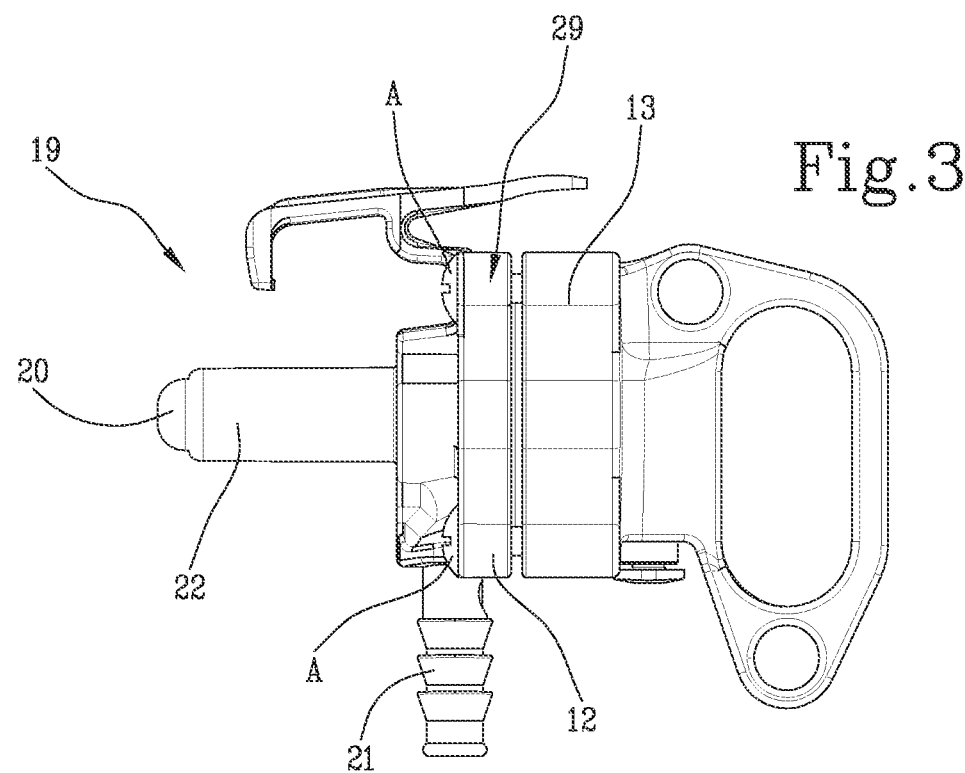
FIGS. 3 and 4 are, respectively, a full side view and a cross-sectional side view of the valve of FIG. 2.
Figure 4:
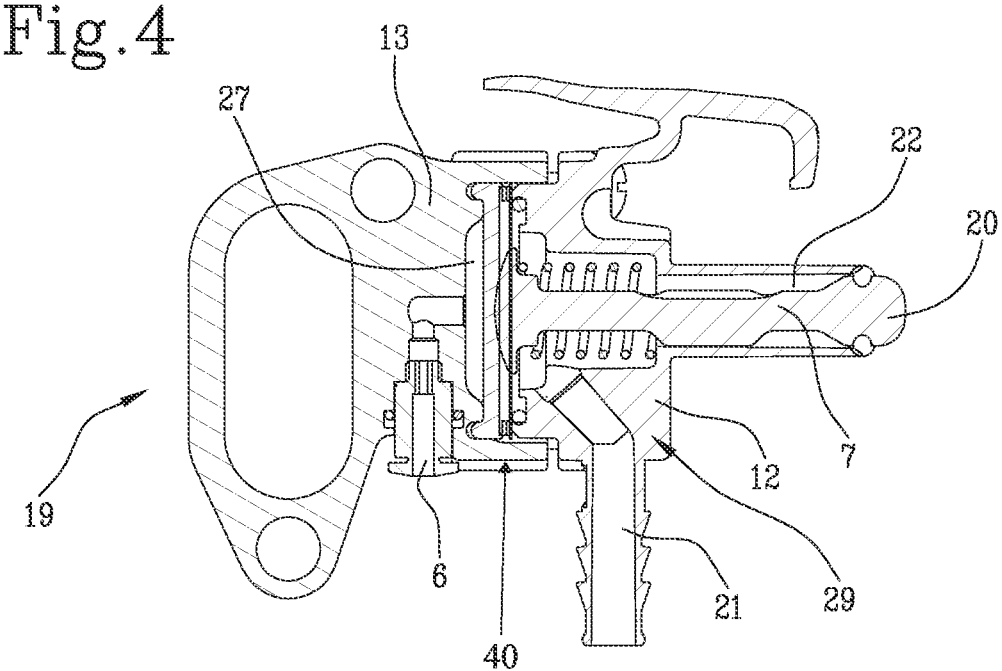
Figure 6:
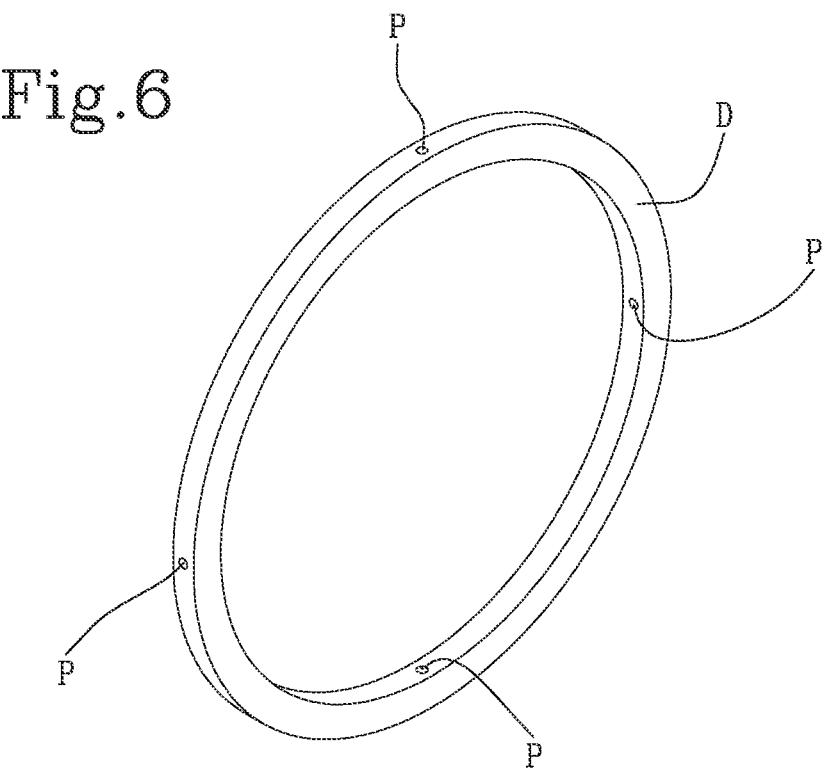
FIG. 6 shows detail view of a valve component.
Figure 5:
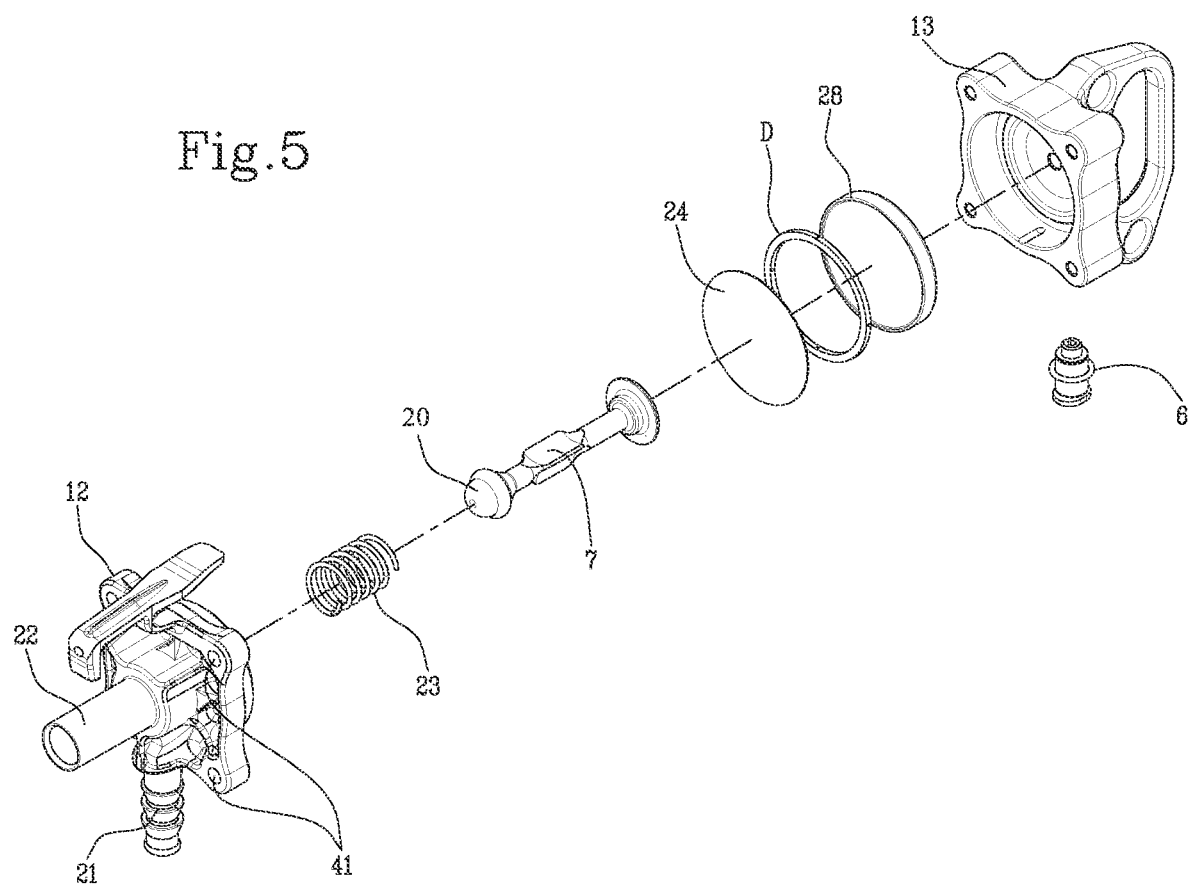
FIG. 5 illustrates the valve schematically and with some parts removed in an exploded view to better illustrate its components.

With reference to FIGS. 2 to 4, each pneumatically actuated valve 19 comprises a valve body 29 with an inlet duct 22 and an outlet duct 21.

The inlet duct 22 of the valve 19 is connected to a corresponding feeding container 3 containing a base product or an additive, while the outlet duct 21 of the valve 19, attached to the valve body 29, is connected to a transfer duct 8 of the network 15.

Operating inside the valve 19 there are shut-off means 7, 20 for selectively interrupting or allowing the connection between the inlet duct 22 and the outlet duct 21. The shut-off means 7, 20 comprise a shutter 20, which acts on end walls of the inlet duct 22, and a stem 7, which extends longitudinally within the valve body 29.

To actuate the shutter 20 by means of the stem 7, there is a control chamber 27 associated with the valve body 29 on the side opposite to the inlet duct 22.

The control chamber 27 comprises a first shell 12, which is attached to (made as one piece with) the valve body 29, and a second shell 13, which is associated with the first shell 12 through the perimeter edge—interposed between the first and second shells—of a first deformable membrane 28 constituting a flexible wall which delimits a closed sealed space inside the control chamber 27. The closed sealed space can be selectively connected to a source of pressurized fluid, specifically compressed air, to deform the deformable membrane 28 and actuate the shutter 20 by means of the stem 7.

Besides the first deformable membrane 28, the control chamber also has a second deformable membrane 24 also adapted to delimit the closed space and mechanically connected to the stem 7 to operatively act thereon and actuate the shutter 20.

More specifically, the arrangement of the components of the valve 19 is such that the second deformable membrane 24 is interposed between the first deformable membrane 28 and the shut-off means 7, 20, with the perimeter edges of both membranes 24, 28 being further interposed between the first shell 12 and the second shell 13.

More specifically, the perimeter edges of the two membranes 24, 28 may be in contact with each other.

Operatively, when the closed, sealed space is connected to the source of pressurized fluid, the second deformable membrane 24 is deformed and pushes against the first deformable membrane 28 until it, too, is deformed.

As a whole, the deformation of the two deformable membranes 24, 28 produces a thrust force acting on the stem 7 which displaces the shutter 20 to free the end of the inlet duct 22, thereby causing the valve 19 to adopt an open configuration. It should be noted that the second deformable membrane 24 has one face which directly confronts a corresponding face of the first membrane 28.

In other words, at least one portion of the first deformable membrane 28 and a respective portion of the second deformable membrane 24 do not have any other components or parts of the valve 19 interposed between them so that when the second deformable membrane 24 is deformed, it comes at least partly into contact with the first deformable membrane 28 and in turn causes the latter to be deformed.

Elastic means, comprising a helical spring 23, are supportably mounted with a first end against the inside of the first shell 12 and with a second end, opposite the first end, acting on the side of the first or the second membrane 28, 24 facing the stem 7.

The spring 23 acts on the membranes 28, 24 to return the shutter 20 to, and/or hold it at, the position where it closes the inlet duct 22.

That way, a pneumatically actuated valve 19 is created which is normally closed by effect of the elastic reaction of the helical spring 23.

The closed space is connected to the source of pressurized fluid through a spigot 6 that originates from the second shell 13 and connects with a tube 18, such as a hose, for example.

The tube 18 leads into a compressed air distributor 17 controlled by the control unit 11 which commands enablement thereof when the valve 19 must be opened and disablement thereof when the valve 19 is to be closed.

It should be noted that, normally, that is to say, when compressed air is not being supplied to the valve 19 (more precisely, when compressed air is not being supplied to the control duct 18), the shutter 20 is at the position where it interrupts the connection between the inlet duct 22 and the outlet duct 21.

The provision of the two membranes 28 and 24, first and second, to seal the closed space, besides giving greater structural strength to the deformable assembly which they constitute, also allows creating a safety system for the valve such that breakage of the first or the second membrane 28, 24 causes the seal of the closed space to be broken towards the outside environment, thereby preventing the pressurized fluid from flowing back through the inlet or the outlet duct 22, 21, which is protected by the membrane that remains whole.

In particular, if one of the membranes breaks, pressurized air is prevented from flowing through the inlet duct 22 to reach the feeding container 3 and thus cannot cause the latter to burst and to spill its contents into the frame 2 of the machine 1. The problems mentioned in the introductory section hereof are thus avoided.

The valve 19 described up to here is thus installed on a machine 1 for the production of liquid or semi-liquid food products, obtained from base and/or additive products contained in corresponding feeding containers 3 and withdrawn by means of a network 15 of transfer ducts 8 leading to a processing chamber 5.

The valve 19 can be activated and deactivated independently of the remaining valves 19 to connect and disconnect the respective feeding container 3 to and from the transfer duct network 15 and the processing chamber 5.

The machine 1 also comprises a compressor 16 adapted to generate compressed air which is then selectively sent to a compressed air distributor 17, connected to the compressor 16, according to commands received from the operation and control unit 11.

A plurality of service hoses 18 connect the compressed air distributor 17 to the valves 19 to bring a flow of compressed air to each of the valves. In effect, the compressed air distributor 17 is configured to be able to release an air flow independently to each of the valves 19.

The presence of different feeding containers 3 with respective valves 19 which are controllable independently makes it possible to switch in a very quick, easy and reliable manner from one feeding container to another, thereby avoiding prolonged machine down times.

The fact that the valve 19 is pneumatic and that the machine 1 is equipped with a compressor 16 and a compressed air distributor 17 means that the processing chamber 5 can be fed in a particularly reliable manner with any type of basic ice cream product under all typical shop working conditions.

According to another aspect, the machine 1 is equipped with a dispenser 39 connected to the processing chamber 5 to serve the product from the processing chamber 5.

All the aims set out above are thus achieved.

More specifically, a valve is provided for controlling the supply of products withdrawn from corresponding flexible containers in a machine for making ice cream or liquid or semi-liquid products with a constructional configuration such as to ensure correct operation at all times or in any case to prevent the pressurized air used for its operation from reaching the container it is connected to.

That way, a machine is provided for making liquid or semi-liquid products which is equipped with the above mentioned valve in such a way as to prevent the pressurized air used for its operation from breaking the flexible containers and from causing the base products contained therein to spill into the machine, thus allowing prolonged machine down time to be avoided.

It should be noted that the first deformable membrane 28 is preferably coupled to the first shell 12.

Preferably, the first deformable membrane 28 is rigidly coupled (welded) to the first shell 12.

Preferably, the first deformable membrane 28 is induction welded to the first shell 12.

Similarly, the second deformable membrane 24 is preferably coupled to the second shell 13.

Preferably, the second deformable membrane 24 is rigidly coupled (welded) to the second shell 13.

Preferably, the second deformable membrane 24 is induction welded to the second shell 13.

It should be noted therefore that the first shell 12 coupled to the first deformable membrane 28 is mechanically connected to the second shell 13 which is in turn coupled to the second membrane 24.

The valve thus comprises coupling means A which are configured to couple the first shell 12 securely though reversibly, to the second shell 13 so as to define the aforementioned mechanical connection between the two. More specifically, in a possible embodiment, the coupling means A comprise fastening screws and the first and the second shell 12, 13 are provided with internally threaded insertion holes 41 disposed so that when the valve 19 is in an assembling configuration, they are aligned with each other and can receive the fastening screws.

More specifically, the insertion holes 41 may, for example, be disposed on a perimeter portion of the shells 12, 13.

Generally speaking, it should be noted that once the first and the second shells 12, 13 have been coupled to each other, the coupling between them, whatever the structure of the coupling means A, is not a sealed coupling (that does not have a fluid seal).

Thus, if the first membrane 28 breaks, the base liquid contained inside the feeding container 3 flows out of the valve 19 (through the coupling zone between the first and the second shell).

That way, the breakage is immediately perceptible to an operator, who becomes immediately aware of the fault in the valve 19.

In the same way, it should be noted that if the second membrane 24 breaks, pressurized air flows out (when the valve is activated) through the coupling zone between the first and the second shell 12, 13. Once again, the fault is immediately perceptible to an operator, in this case because of the unusual sound made by the pressurized air flowing out through the valve 19.

Thus, the mechanical coupling between the first shell 12 and the second shell 13 is not a fluid sealed coupling which, in this specific case, is made by fitting together the protrusions 40 and the insertion holes 41.

More precisely, the coupling between the first and the second shell 12, 13 defines a space between the first membrane 28 and the second membrane 24 without a fluid seal.

Structurally, the aforementioned space is created by interposing a spacer element D between the first deformable membrane 28 and the second deformable membrane 24, in such a way as to form an intermediate chamber that is not fluid sealed.

This prevents the formation of negative pressure inside the control chamber 27 between the two membranes 24, 28 during operation of the valve 19, which would cause the two membranes to adhere to each other and thus to not function correctly.

The spacer element D prevents the two membranes 24, 28 from adhering to each other creating a sort of "vacuum" zone modifying the operating conditions of the valve.

In effect, if the two membranes 24, 28 were to adhere to each other, they would no longer be moved independently and, moreover, should one of the membranes break, the operator would not perceive the consequent leakage of air/base product because the other membrane, adhering to it, would—temporarily—seal the broken zone.

Preferably, as shown in the accompanying drawings, the spacer element D comprises an annular member adapted to engage respective peripheral portions of the first and the second deformable membrane 24, 28.

More specifically, the annular member can come into abutment against portions of the deformable membranes 24, 28 immediately adjacent to (and radially inner relative to) the perimeter edges that are fixedly coupled to the respective shells 12, 13.

Alternatively, the annular member may be of a size such as to come into abutment against the perimeter edges, so as to be interposed completely between the two deformable membranes 24, 28.

According to this aspect, the intermediate chamber has a substantially cylindrical structure, delimited by the deformable membranes 24, 28 (which define its two base surfaces) and the inside wall of the annular member (which defines its lateral surface).

It should be noted that in general terms, the spacer element D might also be structured differently (for example, it may have a polygonal cross section) provided always that it is able to contribute to defining the intermediate chamber with the deformable membranes 24, 28.

Advantageously, the annular member is provided with a plurality of through holes P which extend radially through its lateral surface to facilitate the passage of fluid from the intermediate chamber to the outside environment.

This ensures that negative pressure is not formed between the two membranes 24, 28 so they do not adhere to each other.

Furthermore, if one of the two deformable membranes 24, 28 breaks, the fluid on the side of the valve 19 facing the damaged deformable membrane 24, 28 is sure to leak out, as described above, thus promptly and correctly alerting the operator to the existence of the fault.

It should also be noted that during operation of the valve 19, the deformation of the second deformable membrane 24 causes the fluid (for example, air) to flow out of the intermediate chamber to allow it to be pushed against the first deformable membrane 28 which is in turn deformed to actuate the shut-off means 7, 20.

Preferably, the first and/or the second membrane 28, 24 is/are made of an elastomer (still more preferably, a thermoplastic elastomer).

It should be noted that the use of a thermoplastic elastomer for the first and/or the second membrane 28, 24 advantageously makes welding to the respective shell 12, 13 possible.

As regards the first shell 12 and/or the second shell 13, it should be noted that the first shell 12 and/or the second shell 13 is/are made of a resin (preferably acetalic resin).

Described according to another aspect is a machine for making liquid or semi-liquid food products, comprising:

a frame 2;

at least one deformable feeding container 3 (preferably a plurality of them) containing a liquid or semi-liquid base mixture, and such that the volume occupied by each first container 3 depends on a quantity of base mixture inside the same first container 3;

a processing chamber 5 for said base mixture, comprising a stirrer and thermal treatment means for processing said base mixture, which operate in conjunction to convert the base mixture into a liquid or semi-liquid product;

a network 15 of transfer ducts 8 connecting the feeding containers 3 to the processing chamber 5, and configured to allow each of the feeding containers 3 to be operatively connected to the processing chamber 5 and to transfer the base mixture from each of the feeding containers 3 to the processing chamber 5;

an electronic control unit 11 for operating and controlling the machine 1; the network 15 of transfer ducts 8 being connected to a plurality of pneumatically actuated valves 19 (of the type described above), each of the valves associated with one of the feeding containers 3 being activated and deactivated independently of the remaining valves 19 to allow the corresponding container 3 to be connected to the processing chamber 5.

According to another aspect, the machine comprises supporting means 9 for supporting the feeding containers 3 and operatively associated with the frame 2.

The invention claimed is:

1. A pneumatically actuated valve, comprising:
a valve body including a shut off valve disposed therein;
the valve body having a first shell and a second shell;
an inlet duct extending from the first shell of the valve body and having an end wall open to an exterior of the valve body, the inlet duct configured for connection to a product source;
an outlet duct extending from the first shell of the valve body orthogonally to the inlet duct;
the shut-off valve acting to selectively interrupt or allow a connection between the inlet duct and the outlet duct;
a control chamber defined between the first shell and the second shell of the valve body, and including:
a first deformable membrane and a second deformable membrane which are adapted to form a flexible wall delimiting a closed, sealed space inside the control chamber and which operate on the shut-off valve;
the first deformable membrane being rigidly coupled to the first shell;
the second deformable membrane being rigidly coupled to the second shell;
a spacing element interposed between the first deformable membrane and the second deformable membrane to define an intermediate chamber between the first deformable membrane and the second deformable membrane, the intermediate chamber being without fluid sealing;
wherein the spacing element includes a plurality of through holes to promote a flow of fluid from the intermediate chamber to an external environment;
wherein the shut-off valve further comprises:
a shutter which acts on the end wall of the inlet duct to open and close the inlet duct and the shutter is operatively coupled to the first and second deformable membranes, a spring acting on the first and second deformable membranes for at least one chosen from returning the shutter to and holding the shutter at a position for closing the inlet duct;

a stem including the shutter at a stem first end and the stem operatively connected to the first and second deformable membranes at a stem second end, and wherein the spring comprises a helical spring with a spring first end abutted against an inner side of the first shell and with a spring second end abutted against a side of one of either the first or the second deformable membrane facing the stem via the stem second end;

wherein the inlet duct has a first end and an opposite second end defining the end wall, the first end facing towards one of the first and second deformable membranes and wherein the shutter acts on the inlet duct, at the second end;

wherein the through holes are radial holes;

wherein the through holes are configured to prevent negative pressure from being formed between the first deformable membrane and the second deformable membrane so that the first deformable membrane and the second deformable membrane do not adhere to each other;

a mechanical coupling connecting the first shell to the second shell; the mechanical coupling including protrusions on one of the first shell and the second shell configured to mate with insertion holes on the other of the first shell and the second shell, the mechanical coupling being a non-fluid sealed coupling; and wherein the stem extends into the inlet duct and the shutter extends past the end wall of the inlet duct to the exterior.

2. The pneumatically actuated valve according to claim 1, wherein the spacing element comprises an annular member disposed in abutment on a peripheral portion of the first deformable membrane and the second deformable membrane.

3. The pneumatically actuated valve according to claim 1, wherein the second deformable membrane is disposed with one face directly facing a corresponding face of the first deformable membrane.

4. The pneumatically actuated valve according to claim 1, wherein the pneumatically actuated valve is a normally closed valve.

5. The pneumatically actuated valve according to claim 1, and further comprising a spigot, wherein the closed, sealed space is connected to a pressurized fluid source by the spigot that originates from the second shell and opens into a tube which connects with a compressed air distributor operatively controlled by a control unit which commands enablement thereof when the shut-off valve is opened and disablement thereof when the shut-off valve is closed.

6. A machine for producing a liquid or semi-liquid food product, comprising:
   a plurality of the pneumatically actuated valves according to claim 1;
   a frame;
   a plurality of deformable first feeding containers which contain a liquid or semi-liquid base mixture, and such that a volume occupied by each of the plurality of deformable first feeding containers depends on a quantity of base mixture contained therein;
   a processing chamber for the base mixture, comprising a stirrer and a thermal treatment system for processing the base mixture, which cooperate with each other to convert the base mixture into the liquid or semi-liquid product;
   a network of transfer ducts connecting the plurality of deformable first feeding containers to the processing chamber, and configured to allow each of the plurality of deformable first feeding containers to be operatively connected to the processing chamber and to transfer the base mixture from each of the plurality of deformable first feeding containers to the processing chamber;
   an electronic control unit for operating and controlling the machine;
   the network of transfer ducts being connected to the plurality of pneumatically actuated valves, each of the plurality of the pneumatically actuated valves operatively connected with one of the plurality of deformable first feeding containers being actuated and deactivated independently of remaining ones of the plurality of the pneumatically actuated valves to allow the one of the plurality of deformable first feeding containers to be placed in communication with the processing chamber.

7. The machine according to claim 6, comprising an interface connected to the electronic control unit and including control commands, which are operable to control the plurality of pneumatically actuated valves to selectively place one of the plurality of deformable first feeding containers in fluid communication with the processing chamber.

8. The machine according to claim 6, comprising at least one transfer pump operatively interposed between the plurality of deformable first feeding containers and the processing chamber for transferring fluid from the plurality of deformable first feeding containers to the processing chamber.

* * * * *